3,026,206
PROCESSES FOR TENDERING MEAT
Beverly E. Williams, La Grange Park, Ill., assignor to Hodges Research and Development Company, New York, N.Y., a corporation of California
No Drawing. Filed Sept. 14, 1960, Ser. No. 55,829
4 Claims. (Cl. 99—107)

The present invention relates to processes for tendering meat and more particularly to such processes in which the meat is diathermally, uniformly elevated to tenderizing temperature while the bacterial and mold activity may be reduced by the use of antibiotics or ozone-producing ultraviolet lights.

The so-called "Tenderay" process is well known to the art and is described in its various aspects in several patents, most of which have now expired, and is rather generally described in the Reiman Patent No. 2,932,573 of April 12, 1960. According to this process, animal carcasses or cuts are taken from the cold room where they are stored after slaughter and where the meat is at temperatures approximating 35° F. The meat is then placed in a room maintained at a temperature of from 60 to 72° F. and allowed to warm up over a period from 48 to 60 hours. Ultraviolet light is furnished in the room at approximately 2527 Angstrom units to reduce the bacterial count and the mold in the room to prevent spoilage of the meat while it is aging. The room is maintained at an atmosphere of high humidity circa 90% to minimize the evaporation of moisture from the meat.

I have now found that, if the chilled carcasses, parts or cuts thereof are first uniformly, diathermally raised in temperature by induction, di-electric or microwave heating means, to a temperature approximating that or above that of the room in which the meat is to be aged, say from approximately 50 to 90° F., most unexpected advantages are obtained including improved color and appearance of the meat, no condensation on the surface of the meat, greatly increased tenderness, and a substantial reduction in time required to tender the meat, thus greatly increasing the capacity of the rooms and very greatly reducing meat inventories, all of which result in a substantial economic savings.

I have further found that the chilled meat should be raised in temperature in as short a period of time as possible before admission to the room where it is to be tendered. I have found that the best and most efficient way for raising the temperature of the meat as above described is by use of diathermal heat, referred to as induction, di-electric or microwave or by a combination thereof. A combination of di-electric and induction, for example, gives a uniform temperature rise to the meat. I have found that di-electric heat is especially suitable for elevating the temperature of the fat, while induction heat is especially suitable for elevating the temperature of the bone and lean meat (protein). The specific heat of meat is around .83, its moisture content is around 65%. The tubes for accomplishing this process have a life expectancy of 9000 hours, which makes the process practical and economical. Employing this procedure the temperature of the meat is diathermally elevated uniformly inside and out to a temperature from approximately 50 to 90° F. and near to or higher than that of the treating room temperature within a matter of minutes, say from five to ten minutes, depending upon the amount of electrical energy employed.

The meat is then placed in the treating room which is maintained at an air temperature of from 60 to 72° F. at relatively high humidities above 90% and for approximately 24 to 48 hours more or less. Bacterial level and mold count may be controlled while the meat is being treated by the conventional ozone producing ultraviolet lights or by supplying the treating room with an antibiotic spray. After calculated tendering, the meat is removed from the treating room and chilled to approximately 35° F. in the usual manner. This is a substantial saving in time over that required by the "Tenderay" process referred to above in which a period of 48 to 60 or 72 hours is usually required. Further, I have found that because of the rapid rise in temperature before entering the room the meat is phenomenally brighter red and of much better color than when processed under the regular procedure. This is because the chromo-protein myoglobin or muscle hemoglobin significantly brightens and becomes lighter red when temperatures approach or exceed 60° F. In Tenderay, the interior of the beef, that is, the red meat portions never reach 60° F. and are often well under 50° F. in the deep-seated areas of the primal cuts even after 60 to 72 hours in the normal Tenderay rooms. Further, the uniform and quick elevation of the temperature of the meat to near that or above the temperature of the treating room obviates condensation of moisture on the surface of the meat and substantially reduces slime and improves the appearance of the fat portions thereof. As noted above, meat treated in accordance with the present concept exhibited a substantial improvement in tenderness over that of the usual procedure, even with room holding periods one-half that normally utilized and required in the "Tenderay" process.

It is possible with the present process to elevate the temperature of the meat just short of cooking temperatures of 120° F. to say 80 to 90° F., before admission into the treating room to increase the tenderness of the meat and thus to shorten the time required for the meat to remain in the treating room.

In the "Tenderay" process when the chilled meat is moved into the room and allowed to warm up to room temperature over a period of 48 to 60 hours, more or less, the meat never exceeds the room temperature and while the surface of the meat reaches a temperature close to that of the air of the room, internal temperatures within the meat are often 10 to 15° lower than room temperature. At the end of the tendering period the meat is then moved back into the beef coolers and chilled down to about 35° F. The outer surfaces of the meat and fat are therefore subject to extreme ranges of temperature and therefore deteriorate rapidly in appearance.

With the process of the present invention, on the other hand, the appearance of the surfaces of the meat is vastly improved, the time for tendering the meat is substantially reduced and great improvement in tenderness has been experienced. With diathermal heat treatment of the meat before tendering, there is no condensation on or evaporation from the surface of the meat and slimy meat or excessive shrinkage does not occur. The process of the present invention shortens by approximately one to two days the time previously required for the "Tenderay" process.

Bacterial level and mold count may be controlled in the treating room by means other than ultraviolet light as by spraying an antibiotic into the room, onto the meat, and the like. A solution of 100 p.p.m. of a suitable broad spectrum antibiotic, such as an oxytetracycline, has been found advantageous in retarding bacterial development on the meat in the elevated temperature holding room. A solution of 0.5% of potassium sorbate has been found advantageous in retarding mold growth on the meat and in the room. The antibiotic and the sorbic solutions may be used simultaneously or successively.

It should now be apparent to those skilled in the art that the object of the present invention of providing a novel process for tendering meat has been attained.

Changes in or modifications to the present invention,

What is claimed is:

1. In a process for tendering meat the steps of diathermally raising the internal temperature of chilled meat to a temperature within the range of approximately 50 to 90° F., in from approximately 5 to approximately 10 minutes, then subjecting the meat to treatment temperatures of from approximately 60 to 72° F. in an atmosphere of high humidity for approximately 24 hours and until tender, the diathermally raised temperature of the meat being approximately that of the subsequent treatment temperature, and then chilling the meat.

2. In a process as described in claim 1 the step of controlling bacterial count and mold level in the atmosphere of the treating room by spraying an antibiotic into the air of the room.

3. In a process as described in claim 1 the step of controlling bacterial count and mold level of the meat by spraying the meat with an antibiotic solution and a potassium sorbate solution.

4. In a process as described in claim 1 the step of controlling bacterial count and mold level of the meat by ozone-producing ultraviolet lights.

References Cited in the file of this patent

UNITED STATES PATENTS

| | | |
|---|---|---|
| 2,650,882 | Sperti | Sept. 1, 1953 |
| 2,816,836 | Williams | Dec. 17, 1957 |
| 2,870,018 | Williams | Jan. 20, 1959 |
| 2,926,090 | Williams | Feb. 23, 1960 |
| 2,932,573 | Reiman | Apr. 12, 1960 |

OTHER REFERENCES

"Food," May 1959, page 189, article entitled Soluble Sorbate Inhibitor.